Jan. 16, 1934.   W. A. DEL MAR   1,944,003
ELECTRIC CABLE
Filed Jan. 14, 1932
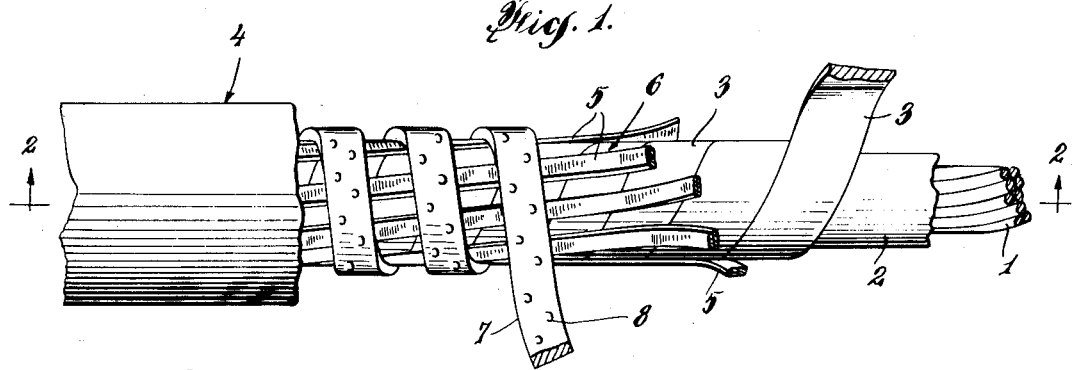
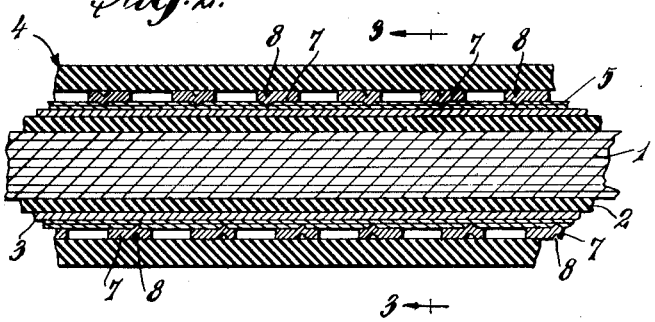
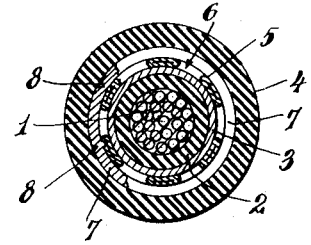
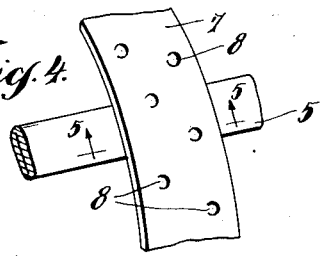
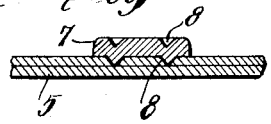
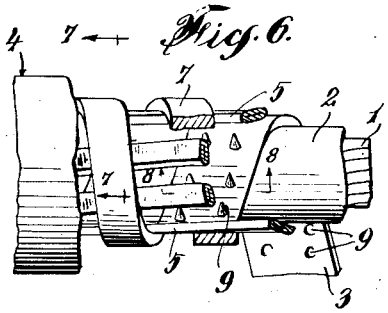
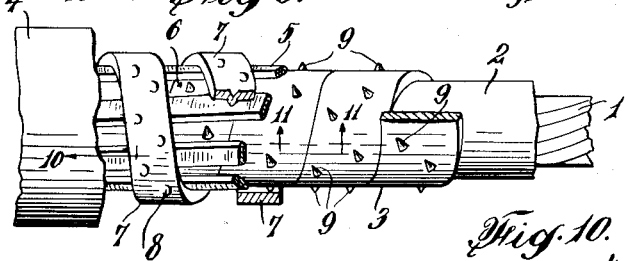
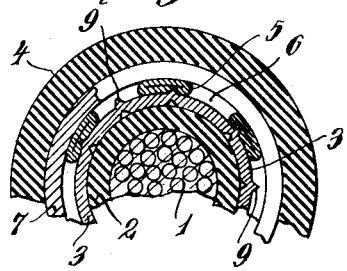
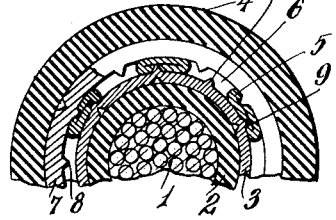
INVENTOR
Wm. A. Del Mar.
BY T. F. Bourne
ATTORNEY Patented Jan. 16, 1934

1,944,003

UNITED STATES PATENT OFFICE 1,944,003

ELECTRIC CABLE

William A. Del Mar, Greenwich, Conn., assignor to Habirshaw Cable and Wire Corporation, New York, N. Y., a corporation of New York Application January 14, 1932. Serial No. 586,567

9 Claims. (Cl. 173—266)

High tension electric cables containing liquid oil have been provided with longitudinal oil channels to permit the free egress and ingress of oil as the oil expands or contracts with various temperatures of the cable. Such cables have been formed with a channel in a cylindrical core in the conductor, or with a pipe in the space between conductors of a multiple-conductor cable. Oil channels have also been proposed either in the lead sheath of the cable or between such sheath and the shielded insulation.

My invention pertains to improvements in electric cables of the class referred to, the object of my invention being to provide such cables with oil channels between the sheath and the shielded insulation, of a simple and efficient character, whereby the cable may be coiled and straightened without danger of disruption of the walls of the oil channels in such a way as to interfere with the flow of oil through the channels.

In carrying out my invention I provide an electric cable having shield and sheath, with multiple strips spaced apart and helically laid over the shield, such strips being held in place by a binder or tape of suitable material wound around said strips substantially at right angles thereto and within the outer sheath. In order to resist movement of the aforesaid strips and tapes I provide projections which engage the strips, which projections may extend either from the binding tape into the strips, or from the shield into the strips, or both from the tape and from the shield into the strips, whereby displacement of the latter is prevented so that the channels between the strips will not be deformed or closed by reason of shifting of the strips relatively one to the other.

Reference is to be had to the accompanying drawing, wherein

Fig. 1 illustrates an electric cable embodying my invention;

Fig. 2 is a section on line 2, 2, in Fig. 1;

Fig. 3 is a cross section on line 3, 3 in Fig. 2;

Fig. 4 is a detail perspective view;

Fig. 5 is a section on line 5, 5 in Fig. 4;

Fig. 6 is a broken detail of a modification;

Fig. 7 is a section on line 7, 7 in Fig. 6;

Fig. 8 is an enlarged detail section on line 8, 8 in Fig. 6;

Fig. 9 illustrates a cable embodying features of Figs. 1 and 6;

Fig. 10 is a section on line 10, 10 in Fig. 9, and

Fig. 11 is an enlarged detail section on line 11, 11 in Fig. 9.

In the drawing I have illustrated an electric cable made in a convenient or well-known form comprising conductor 1 (which may comprise single or multiple wires) having suitable insulation, at 2, and enclosed with a shield 3, such as copper, and finally an outer sheath 4, such as lead, applied in the well-known way. Between the shield and the sheath 4, as illustrated, I wind spaced strips or separators 5, helically laid, preferably in a long lay, providing channels 6 extending along the shielded conductor between the shield 3 and the sheath 4. The strips or separators 5 are held tightly in place by a binder tape or band 7 which is helically wound around the strips 5, but substantially at right angles thereto, and preferably in a relatively short helical lay, the tape or band 7 being located between the strips 5 and the sheath 4. The tapes or separators 5 may be laid in even spaced relation during the manufacture of the cable, and may be immediately held in place by winding the tape or bank 7 therearound. The strips or separators 5 may be of metal, fibre, fabric or any suitable material. By preference I form the strips or separators 5 of tubular braided fabric, such as cotton, which will flatten into a double layer like a ribbon when laid around the shielded conductor. This tubular construction has the advantage that when it is applied, an accidental twist of the tubular braided strip will not cause a deformation thereof to the detriment of the cable.

In order to keep the strips or separators 5 from displacement or sliding out of their designed position in the cable, thereby destroying their even spacing and reducing the width of the channels 6 at various places, I provide means to retain the separators from displacement and to this end I provide projections to enter the strips to retain them. I have illustrated the binding tape 7 as provided with projections 8 that extend inwardly and enter the strips 5 whereby the latter are kept from displacement, as illustrated in Figs. 1, 3 and 5. The projections 8 may be conveniently provided by pressing the projections out of the tapes or bands 7 when the latter are made of suitable metal. Instead of providing the projections on the tape 7 such projections may be provided on the metal shield 3, at 9, extending outwardly and entering the strips or separators 5 to keep the latter from displacement, as illustrated in Figs. 6, 7 and 8. The projections 9 may be pressed out of the metal of the shield.

For some cables it may be desirable to have the projections extend into the strips or separators 5 from both the binding tape 7 and from the shield 3, such as illustrated in Figs. 9, 10 and 11. In this construction the strips or separators 5 will be doubly retained between projections 8 and 9.

The arrangement described may be applied either in single-conductor or multiple-conductor cables. My improvement is advantageous in that the channels 6, having walls defined by the shield 3, the sheath 4 and spaced strips or separators 5 will be maintained in proper condition for the flow of insulating oil through the channels because the otherwise flexible walls of the channels, comprising the strips or separators 5, might become displaced and thereby reduce the width of the channels, such as during winding or unwinding and straightening of the cable, whereas with my improvement such walls of the channels are retained substantially in the original spacing, whereby the cables are free to be manipulated without danger of causing obstruction to the flow of the oil through the channels 6.

Having now described my invention what I claim is:

1. An electric cable having a shield and a sheath and provided with spaced helically wound longitudinally disposed strips between the shield and sheath providing longitudinal channels between the shield, the sheath and the strips, and a binder around the strips, one of the members of the cable having projections entering said strips to resist displacement of the latter and prevent change in the width of the channels.

2. An electric cable having a shield and a sheath and provided with spaced helically wound longitudinally disposed strips between the shield and sheath providing longitudinal channels between the shield, the sheath and the strips, and a binder around the strips, said binder being provided with projections in engagement with the strips to resist displacement of said binder and strips and retain the normal width of the channels.

3. An electric cable comprising an inner shield, an outer sheath, spaced strips extending lengthwise of the cable between the shield and sheath, and a binder around the strips against the sheath, the shield having projections in engagement with the strips to resist displacement of the latter and prevent change in the width of the channels.

4. An electric cable as set forth in claim 3 in which the binder is provided with projections in engagement with the strips.

5. An electric cable comprising a conductor, insulation around the conductor, a shield around the insulation, spaced strips extending longitudinally along the exterior of the shield, said strips comprising compressible tubular fabric, a binder around said strips enclosing the latter and the shield, and a sheath enclosing the binder, the shield, the strips and the sheath providing spaced cannels extending longitudinally along the shield.

6. An electric cable comprising an inner shield and an outer sheath, spaced strips extending along the exterior of the shield, said strips comprising tubular fabric, and a binder around the strips, the tubular strips being flattened by engagement of the binder therewith.

7. An electric cable comprising an inner shield and an outer sheath, spaced strips helically laid around the shield within the sheath, said strips comprising a tubular fabric, a binder tape around the strips, and projections extending from a member of the cable into said strips.

8. An electric cable provided with a shield and a sheath, embracing strips therebetween spaced apart to form channels, a binder around the strips, and anchoring elements between the contiguous surfaces of each of the strips and binder projecting from one of the said surfaces into the other for holding the spaced strips from shifting.

9. A sheathed electric cable comprising a plurality of superimposed members between the insulation and the sheath, said members comprising a shield, strips spaced apart to form channels for insulating fluid and a binder around said strips, and anchoring elements between any contiguous two of said members projecting from one of said members into the other for anchoring the spaced strips.

WILLIAM A. DEL MAR.